US012591161B2

(12) United States Patent
Chidichimo et al.

(10) Patent No.: US 12,591,161 B2
(45) Date of Patent: Mar. 31, 2026

(54) ELECTROCHROMIC WIRE THREAD AND RELATIVE FABRICS

(71) Applicant: TECHNOCELL AG, Morbio Inferiore (CH)

(72) Inventors: Giuseppe Chidichimo, Rende (IT); Egidio Tagliabue, Cernobbio (IT); Amerigo Beneduci, Castrolibero (IT); Giuseppina Anna Corrente, Rende (IT); Giovanni De Filpo, San Fili (IT); Daniele De Rosa, Coverde (IT)

(73) Assignee: TECHNOCELL AG, Morbio Inferiore (CH)

( * ) Notice: Subject to any disclaimer, the term of this patent is extended or adjusted under 35 U.S.C. 154(b) by 896 days.

(21) Appl. No.: 17/783,787

(22) PCT Filed: Dec. 5, 2020

(86) PCT No.: PCT/IB2020/061555
§ 371 (c)(1),
(2) Date: Jun. 9, 2022

(87) PCT Pub. No.: WO2021/116869
PCT Pub. Date: Jun. 17, 2021

(65) Prior Publication Data
US 2023/0011723 A1      Jan. 12, 2023

(30) Foreign Application Priority Data

Dec. 10, 2019    (IT) ......................... 102019000023466
Nov. 27, 2020    (IT) ......................... 102020000028865

(51) Int. Cl.
    *G02F 1/155*        (2006.01)
    *D02G 3/02*         (2006.01)
                        (Continued)

(52) U.S. Cl.
    CPC ............... *G02F 1/155* (2013.01); *D02G 3/02* (2013.01); *D02G 3/12* (2013.01); *D02G 3/22* (2013.01);
                        (Continued)

(58) Field of Classification Search
    CPC .. D06M 11/74; D06M 13/228; D06M 15/263; D06M 15/347; D06M 15/53;
                        (Continued)

(56) References Cited

U.S. PATENT DOCUMENTS 5,729,379 A * 3/1998 Allemand ........... G02F 1/15165
                                                        359/275
5,922,996 A * 7/1999 Ryeczek ................ G01K 11/12
                                                        116/207
                        (Continued)

FOREIGN PATENT DOCUMENTS

CN        109610057 A * 4/2019 ............... D02G 3/02
TW        200907129 A * 2/2009

OTHER PUBLICATIONS

Machine Translation CN109610057 (Year: 2019).*

*Primary Examiner* — Jennifer A Steele
(74) *Attorney, Agent, or Firm* — Rivka Friedman

(57)            ABSTRACT

The present invention is directed to eyectrochromic, super-capacitor yarns and the related fabrics. An electrochromic yarn formed by two interwind threads has been invented. The yarn is electrically isolated by a transparent, uncolored polymer. Each thread is the superposition of three concentric layers. The most internal one, the core, has the function of support and/or conductive layer, the second one is the eiectrochromic layer containing conductive nanoparticies, the third layer is a polymer dielectric blend. The yarns described above allows to generate electrochromic fabrics in which the colour can be varied by the application of small electric voltages fed by a battery with variable power supply (Continued)

controlled by a microprocessor connected to a smartphone via Bluetooth technology. A specific application on the smartphone allows to change the voltage supply to the fabrics, in order to get the desired chromatic change.

8 Claims, 1 Drawing Sheet

(51) Int. Cl.

| | |
|---|---|
| *D02G 3/12* | (2006.01) |
| *D02G 3/22* | (2006.01) |
| *D02G 3/44* | (2006.01) |
| *D03D 15/283* | (2021.01) |
| *D03D 15/292* | (2021.01) |
| *D03D 15/547* | (2021.01) |
| *D06M 11/74* | (2006.01) |
| *D06M 13/228* | (2006.01) |
| *D06M 15/263* | (2006.01) |
| *D06M 15/347* | (2006.01) |
| *D06M 15/53* | (2006.01) |
| *D06M 15/568* | (2006.01) |
| *D06M 101/06* | (2006.01) |
| *D06M 101/30* | (2006.01) |
| *G02F 1/1516* | (2019.01) |

(52) U.S. Cl.
CPC ............. *D02G 3/44* (2013.01); *D03D 15/283* (2021.01); *D03D 15/292* (2021.01); *D03D 15/547* (2021.01); *D06M 11/74* (2013.01); *D06M 13/228* (2013.01); *D06M 15/263* (2013.01); *D06M 15/347* (2013.01); *D06M 15/53* (2013.01); *D06M 15/568* (2013.01); *G02F 1/15165* (2019.01); *D06M 2101/06* (2013.01); *D06M 2101/30* (2013.01); *D10B 2101/20* (2013.01); *D10B 2201/22* (2013.01); *D10B 2331/30* (2013.01); *D10B 2401/063* (2013.01); *D10B 2401/20* (2013.01); *G02F 2202/36* (2013.01)

(58) Field of Classification Search
CPC ........... D06M 15/568; D06M 2101/06; D06M 2101/30; D06M 15/195; D06M 15/3566; D06M 15/63; D06M 15/233; G02F 1/155; G02F 1/15165; G02F 2202/36; G02F 1/163; G02F 1/153; Y02E 60/13; D06P 1/44; D06P 1/5214; D06P 1/5221; D06P 1/525; D06P 1/5264; D06P 1/004; D06P 1/613

See application file for complete search history.

(56) References Cited

U.S. PATENT DOCUMENTS

| | | | | |
|---|---|---|---|---|
| 10,273,600 | B1 * | 4/2019 | Bharadwaj ........... | D03D 1/0088 |
| 2011/0317240 | A1 * | 12/2011 | Sotzing ................. | D03D 15/54 |
| | | | | 359/265 |

* cited by examiner

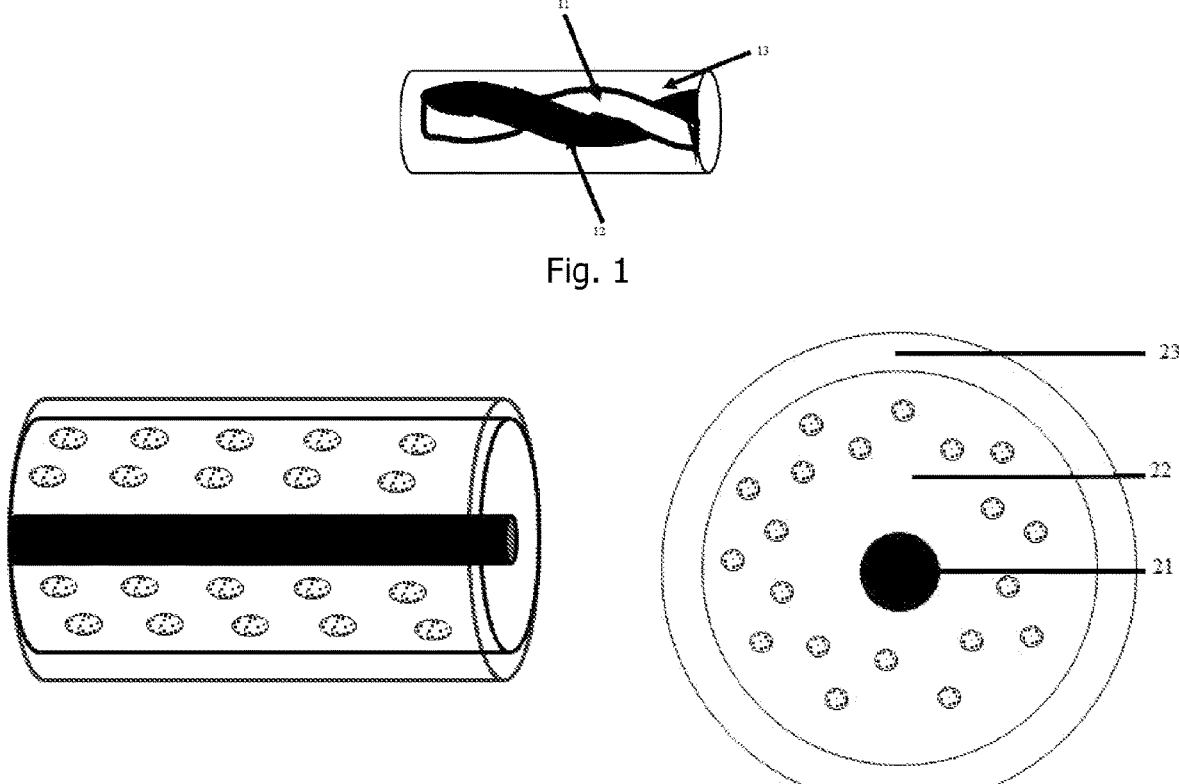
Fig. 1
Fig. 2
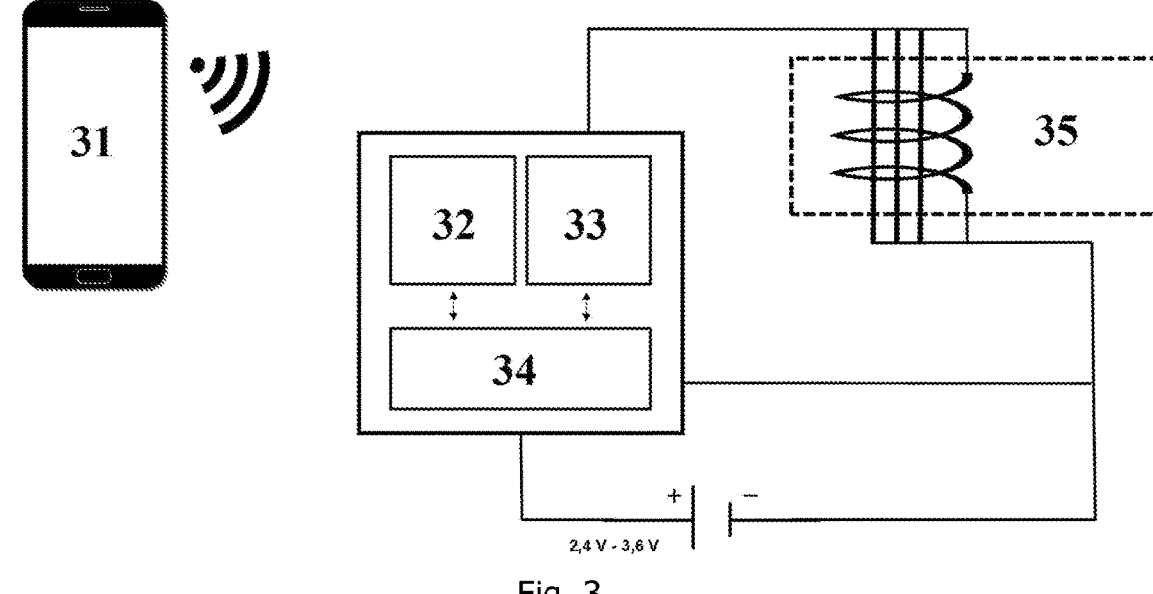
Fig. 3

ELECTROCHROMIC WIRE THREAD AND RELATIVE FABRICS

TECHNICAL FIELD OF THE INVENTION

The invention concerns an electrochromic wire thread which is capable of generating fabrics with variable colourings for small voltage applications. For all purposes the wire of the invention is a super capacitor that dissipates a very limited electrical power in the processes of charging and discharging. The wire thread of the invention, illustrated in FIG. 1, consists of two intertwined fibres (11 and 12), electrically isolated by a protective layer of non-electrically conductive polymer (13). Each of the two fibres is composed of a stratification of three concentric layers (FIG. 2), of which the first is the supporting core and is electrically conductive (21), the second is an electrochromically active layer containing conductive nano particles (22), the third is a dielectric polymer blend (23). The fabrics that can be manufactured with said wire thread are also the object of the present invention, together with the power supply and the colouring control system, schematized in FIG. 3. The fabric (31) is powered by a variable voltage battery (32) managed by a microprocessor (33) that is connected, connected, through a Bluetooth module (34), to an application installed on a Smartphone (34) that allows one to vary the colour of the fabric.

STATE OF THE ART

In the literature two examples are found of electrochromic wire threads that represent the State of the Art prior to the present invention. One is relative to the request for a Patent TW200907129A, in which an electrochromic wire is made by the overlapping of two threads, each of which in turn is covered by an electrolyte. The two threads are coupled and held together by a final layer of transparent polymer. The principal differences of the present invention in respect to that relative to the request for Patent TW200907129A are: In the case of the present invention, the electrochromically active layer of each of the two threads that compose the wire, is a polymeric mixture containing conductive nanoparticles, with a particular preference for the Carbon Nano Tube (CNT). The presence of said particles in the electrochromically active film represents a factor of considerable innovation with respect to the past. On the one hand, it is no longer strictly necessary that the constituent polymer of the second layer must be an electrochromically conductive polymer, because the conductive function is assigned to the nano particles, while the electrochromic function can be assigned to electrochromic molecules of small dimensions which, together with the nano particles, are dispersed in a polymeric matrix with very high optical and mechanical properties. The conductive polymers referred to in the application for a Patent TW200907129A have limitations that are typical of conductive polymers: poor mechanical properties, an average lifespan that is rather brief, electrical conductivities that are not very high. The active layer of the present invention can, instead, be composed of a polymer with elevated mechanical and optical properties such as, for example, Polivinil Butyral (PVB) or also of equally performing polymers, but with the addition of their biodegradability (an ecologically important property at the end of their lives) such as Polyhydroxybutyrate (PHB), Polylactic Acid (PLA), Polyhydroxyvalerate (PHV), or mixtures of these. All these polymers become extrinsically conductive when conductive nano particles are added to them and become electrochromic when small electrochromically stable molecules are added to them. In substance, it is being asserted that the creation of an electrochromically conductive layer with optimal properties from all points of view is assigned, in the present invention, to a polymeric composite rather than to a single Intrinsically Conductive Polymer (ICP). This does not exclude that in particular applications of this invention Intrinsically Conductive Polymers, whose conductive properties are optimized by the addition of conductive nano particles (and whose conduction may be greater with respect to that of the Intrinsically Conductive Polymers), must not be used. The electrochromic properties of the conductive polymers are, furthermore, extremely limited as spectral frequencies, while a practically limitless range of small electrochromic molecules are available, both of the anodic type and of the cathode type, which allow electrochromic operations in very wide ranges of the visible and near infrared spectrum, and which can be used by dissolving them in polymeric matrices of the type mentioned above.

A second innovative aspect of the present invention is connected to the fact that the central core thread does not have to be only a metal wire. Wires of the metallic type have, in fact, excellent properties of mechanical resistance and have excellent electrical conductivity, but they present various drawbacks, such as low levels of elasticity, are notably heavy, they are notably fragile, have a high cost, they are to be avoided in threads that must generate wearable and comfortable fabrics. The present invention foresees the use of a central core that can also be composed of an intrinsic polymer conductor (for example polyaniline (PANI) doped with CNT, which permits threads with extraordinary physical properties (high aspect ratio, light weight, good electrical and thermal conductivity). The mechanical properties of polymer fibres such as PANI, obtained by the addition of CNT, are also better with respect to those of the original fibres. At present, such fibres can be obtained by wet spinning processes that are easy to create. Data are reported in the literature that confirm the fact that fibres of this type can reach a conductivity of the order of about 2000 S cm$^{-1}$. Although these conductivities obviously remain lower than those of metals by more than an order of magnitude, it is undoubtedly possible to recover conductivity by adequately increasing the diameter of the support core. This does not exclude that for particular fabrics our invention can also foresee the fact that the central core of the electrochromic thread can be composed of a metallic wire.

For completeness, it is reported that a new type of electrochromic fibre has recently been introduced by Yang Zhou, Yan Zhao, Jian Fang and Tong Lin in Electrochromic/supercapacitive dual functional fibres (RSC Advances, 2016, 6, 110164). In this work, a system on a single fibre is presented, in which a layer of electroactive polymer is deposited on a superficial gold electrode. The core of the film is composed of a PVC fibre that has a diameter of 2 mm. On this substrate two conductive helical strips of gold are deposited, by the technique of sputtering, and onto which the electrochromic conductive polymer PEDOT has been deposited by electrodeposition. Finally, a thin electrolytic layer, consisting of a gel based on Polymethylmethacrylate (PMMA) plasticised with Propylene Carbonate (PC) and added with lithium salts is deposited onto the entire fibre. This system requires the use of a very expensive metal, and rather complex manufacturing techniques. Furthermore, the external state of the electrochromic fibre is a gel, which has, in any case, ionic electrical conductivity, and which would not be stable to washing processes. The innovation of the present Patent will be better understood from the Figures and in the discussion of the examples of embodiment of the electrochromic wire, object of the patent, given for illustrative and non-limiting purposes.

A BRIEF DESCRIPTION OF THE FIGURES

FIG. 1 represents a complete electrochromic wire thread, according to the present invention, composed of two intertwined fibres, covered by an electrically insulating polymer layer, in which with the number 11 the electrochromic wire 1 is illustrated, with the number 12 the electrochromic wire 2 is indicated, and the insulating polymeric coating is indicated with the number 13.

FIG. 2 represents an axonometric view and a section of an electrochromic wire thread with the different layers that compose it, in which the support/conductive core is represented with 21, the electrochromically active layer with 22, and the electrolytic Polymeric blend layer with 23.

FIG. 3 represents an electrochromic fabric and the switching voltage control system of the electrochromic fabric, in which the electrochromic fabric is represented with 31, the voltage regulator with 32, the microprocessor with 33, the Bluetooth module with 34 and the user interface for the choice of colour for the fabric with 35.

EXAMPLES OF EMBODIMENTS OF THE PRESENT PATENT

Example 1

An electrochromic wire thread in which each of the intertwined fibres is formed of a conductive core and a support in PANI/SWCNT, an active electrochromic layer of PMMA/PEO/SWCNT/NMP/EV/Fc, a layer of dielectric polymer blend of PMMA/PEO. Each fibre that constitutes the intertwined thread is created according to the following procedure:

1) A conductive core and a support, made of a Polyaniline fibre (PANI) created following the procedure illustrated by Pomfet et al. Polymer 41 (2000) 2265-2269, by wet spinning. A solution of PANI protonated with 2-acryloamide-2-methyl-1-propane sulfonic acid (molar ratio 1:0.6) in dichloroacetic acid (10% solution) was used, using acetone as a coagulating solvent. The fibres, with a diameter of 150 micrometres, were stretched room temperature and were found to have a conductivity of 1920 Siemens cm−1 and a Young's modulus equal to 48 MPa.

2) An active electrochromic layer, made in the following manner: a solution containing 40% of Methyl Methacrylate (MM), 5% of Poly Ethylene Oxide (PEO), 50% of N-Methyl Pyrrolidone in which some Single Wall Carbon Nanotube (SWCNT) have been suspended, in proportion equal to 0.5 mg/ml, 2% of Ferrocene (Fc), 2.9% of Ethyl Viologen (EV) and 0.1° A of a radical initiator for UV polymerization. The fibre referred to in Step 1 was immersed in this solution, keeping the two extremities out, thus coating it with a thin layer of it. The fibre was then subjected to UV irradiation for 5 minutes. The layer of solution was thus congealed in a Polymethylmethacrylate (PMMA) polymer coating. The procedure was then repeated until the PMMA coating had formed a layer of 50 micrometres.

3) A dielectric polymeric blend layer, made using a solution containing 50% of methyl methacrylate, 25% of PEO, 25% of Propylene Carbonate (PC). To this solution lithium perchlorate (LiClO4) in a concentration of 1 molar and 0.5% of the total mass of a radical initiator was added. The thread coming from stage 2 was dipped several times in the solution, keeping out the extremities, and was irradiated with UV each time until a layer of 50 micrometres of dielectric polymeric film had formed on it.

4) The formation of the intertwined electrochromic thread. Two portions of fibre prepared as illustrated in the previous steps were woven together.

5) The electrical insulation of the wire. The thread resulting from Step 4 was inserted into a reactor, keeping the extremities out, in which Polyethylene glycol 1400 and the aliphatic diisocyanate 2,2,4-trimethyl-hexamethylene diisocyanate had been nebulized in Microdrops of 25 micrometres in diameter. The above components, reacting to form the urethane bond, generated the coating of the wire with a layer of transparent, insulating, mechanically resistant polyurethane. A wire with an average diameter of 0.6 mm was obtained. The wire thread thus produced is an electrochromic system that passes from transparency to an intense blue colour when powered with a voltage of 2 volts.

Example 2

An elettrochromic wire thread formed of fibres with a supporting conductive core in PANI/MWCNT, an electrochromically active layer of PMMA/PEO/SWCNT/NMP/EV/Fc, and a dielectric polymer blend of PMMA/PEO fibre. The example is analogous to Example 1, different only for the fact that MWCNTs were used in place of the SWCNTs.

Example 3

A wire thread formed of fibres with a conductive support core of PEDOT:PSS, an electrochromically active layer of PMMA/PEO/SWCNT/NMP/EV/Fc, and a dielectric polymer blend layer of PMMA/PEO.

The thread is created as described in Example 1. The procedure for preparing the fibres to be intertwined is precisely analogous to that of Example 1 but, the supporting conductive core is made of PEDOT:PSS polymer instead of PANI. The electrochromic wire behaves analogously to that of Example 1.

Example 4

A wire thread formed of fibres with a conductive support core of PEDOT:PSS, an electrochromically active layer of PMMA/PEO/MWCNT/NMP/EV/Fc, and a dielectric polymer blend of PMMA/PEO.

The example is analogous to Example 3, being different only for the fact that MWCNTs were used in place of the SWCNTs.

Example 5

A wire thread formed of fibres with a conductive support core of metal, an electrochromically active layer of PMMA/PEO/SWCNT/NMP/EV/Fc, and a dielectric polymer blend layer of PMMA/PEO.

The thread is created as described in Example 1. The procedure for the preparation of the electrochromic fibre is analogous to that of Example 1, apart from the fact that Step 1 is eliminated in as much as the conductive support core was substituted by a copper wire with a diameter of 50 micrometres. The electrochromic fibre behaves in a manner analogous to that of Example 1.

Example 6

A wire thread formed of fibres with a conductive support core of metal, an electrochromically active layer of PMMA/PEO/SWCNT/NMP/EV/Fc, and a dielectric polymer blend layer of PMMA/PEO.

The example is analogous to Example 5, being different for the fact that MWCNTs were used in the place of the SWCNTs.

Example 7

A wire thread formed of fibres with a conductive support core of metal, an electrochromically active layer of PVB/PEO/SWCNT/NMP/EV/Fc, and a dielectric polymer blend layer of PMMA/PEO.

The preparation of the wire was carried out as in Example 1. In this example, the preparation of the single fibres necessitated the following steps:

1) The conductive support core is composed of a copper wire with a thickness of 50 micrometres.
2) The electrochromically active layer was created in the following manner: the copper core was co-extruded in an extruder together with a polymer blend, preformed by extrusion in granulometric pellets, by means of a double screw extruder, and containing 45% Polyvinil Butyral (PVB), 10% of Poly Ethylene Oxide (PEO), 40% of N-Methyl Pyrrolidone in which SWCNT in a proportion of 1 mg/ml, 2% of Ferrocene and 3% Ethyl Viologen were previously dispersed. The co-extrusion of the film took place hot, at the head temperature of 150° C. and an outlet temperature equal to 80° C., which generated a coating of 100 micrometers of electroactive polymer on the copper wire.
3) A dielectric polymer blend, created with a solution containing 50% Methyl methacrylate, 25% PEO, 25% Propylene Carbonate (PC). To this solution, Lithium Perchlorate (LiClO4) was added in a concentration of 1 molar and 0.5% of the total mass of a radical initiator. The fibre produced from Stage 2 was dipped several times into the solution, keeping the extremities out, and then irradiated with UV until a 50-micron layer of dielectric polymeric film had formed on it.
4) The two portions of fibre, prepared as illustrated in the preceding steps, were intertwined together.
5) The intertwined fibres resulting from Step 4 were placed into a reactor, keeping the extremities out, in which Polyethylene glycol 1400 and the aliphatic diisocyanate 2,2,4-trimethyl-hexamethylene diisocyanatein (microdrops of 25 micrometres in diameter) were nebulized.

The aforementioned components, reacting to form the urethane bond, covered the intertwined fibres with a transparent, insulating, mechanically resistant polyurethane. The average diameter of the fibre was found to be 0.6 mm. The wire produced in this manner is an electrochromic system that passes from transparency to an intense blue colour when powered with a voltage of 2 Volts.

Example 8

A wire thread formed of fibres with a conductive core and metal support, an electrochromically active layer of PVB/

PEO/MWCNT/NMP/EV/Fc, and a dielectric polymer blend layer of PMMA/PEO. The example is analogous to Example 7, being different only for the fact that MWCNTs were used in the place of the SWCNTs.

Example 9

A wire thread formed of fibres with a conductive core and metal support, an electrochromically active layer of PVB/PEDOT:PSS/SWCNT/NMP, and a dielectric polymer blend layer of PMMA/PEO.

The thread was prepared in an analogous manner to that in Example 7, except for the fact that the electrochromic polymer blend to be extruded is formed of PVB-PEDOT:PSS-SWCNT and was prepared by modifying the procedure proposed by P. J. Bora et al. Materials Letters 252 (2019) 178-181. PEDOT:PSS was added to an ethanolic solution (absolute ethanol) of PVB at 35% by weight in a measure of 10% by weight, stirred constantly. After 1 hour of stirring a given volume of a suspension of carbon nanotubes (1 mg of nanotubes/1 mL of absolute ethanol) was added to the PVB-PEDOT:PSS solution, to have 1% by weight of nanotubes in the final blend. The blend thus obtained was stirred continuously for 3 hours. The blend was then air dried for 48 hours.

Example 10

A wire thread formed of fibres with a conductive support core of metal, an electrochromically active layer of PVB/PEDOT:PSS/MWCNT/NMP, and a dielectric polymer blend layer of PMMA/PEO. The example is analogous to Example 9, being different only for the fact that MWCNTs were used in the place of SWCNTs.

Example 11

A wire thread formed of fibres with a conductive support core of cellulose, coated in PEDOT:PSS, an electrochromically active layer of PMMA/PEO/SWCNT/NMP/EV/Fc, and a dielectric polymer blend layer of PMMA/PEO.

The system was created by using a cellulose thread as the core wire, which was coated with the conductive polymer PEDOT:PSS. The coating was created as in Example 1 by polymerizing the PEDOT:PSS in situ, using the oxidative polymerization procedure of the monomer 3,4-ethylenedioxythiophene (EDOT), according to the literature (Bayer AG, European Patent 440 957, 1991). The preparation of the wire was carried out through the following steps:

1) The supporting and conductive core was prepared by immersing the cellulose in an aqueous solution, consisting of poly acid (4-styrenesulfonate (PSS) and EDOT in the molar ratio 2.5, from 1% by weight of the oxidizing agent sodium persulfate (Na2S2O8) and 0.2% by weight of the catalyst FeSO4 7H2O. The oxidative polymerization was carried out under stirring at room temperature for 24 hours. The fibre thus obtained was subsequently washed in pure water, to remove the residual ions and then subsequently dehydrated.
2) An active electrochromic layer was made from a solution containing 50% of methyl methacrylate, 25% of PEO, 25% of Propylene Carbonate, and 1% of ETV. Lithium perchlorate (LiClO4) was added to this solution in a 1 molar concentration, together with 0.5% of the total mass of a radical initiator. The fibre resulting from Step 1 was dipped several times into the solution, keeping the extremities out, and then irradiated with UV until a layer of 50 micrometres of dielectric polymeric film had formed on the fibre.

3) The fibre obtained from Step 2) was coated with a solid polymeric electrolyte, made similarly to as reported in Step 2) of Example 1.

4) The two portions of fibre, prepared as illustrated in the previous steps, were intertwined together.

5) The intertwined fibres from Step 4 were coated with an insulating polyurethane obtained in an analogous manner to as reported in Example 1.

The wire thread thus produced is an electrochromic system, that passes from transparency to an intense blue colour when powered with a voltage of 2.5 Volts.

Example 12

A wire thread formed of fibres with a conductive support core of cellulose, coated with PEDOT:PSS/SWCNT (MWCNT), an electrochromically active layer of PEDOT: PSS/SWCNT, and a dielectric polymer blend layer of PMMA/PEO. The example is analogous to Example 11, being different only for the fact that the electrochromically active layer is composed of PEDOT: PSS/SWCNT instead of PMMA/PEO/SWCNT/NMP/EV/Fc. The creation of the wire involved the same steps 1), 3), 4) and 5) given in Example 11, with the difference that in Step 1) in the aqueous solution of PSS and EDOT the carbon nanotubes in a concentration of 1 mg/mL were dispersed.

Example 13

A wire thread formed of fibres with a conductive support core of cellulose, coated with PEDOT:PSS/SWCNT, an electrochromically active layer of PMMA/PEO/SWCNT/NMP/EV/Fc, and a dielectric polymer blend layer of PMMA/PEO. The Example is analogous to Example 11, being different only for the fact that the cellulose support was coated with a PEDOT blend of PEDOT: PSS/SWCN, created as in Example 12 (Step 1). Steps 2) and 5) of Example 11 were also repeated in this example.

Example 14

A wire thread formed of fibres with a conductive support core of cellulose, coated with SWCNT, an electrochromically active layer of PMMA/PEO/SWCNT/NMP/EV/Fc, and a dielectroc polymer blend layer of PMMA/PEO. The system was created by using a cellulose fibre as a central core, which was coated with SWCNTs. The creation of the wire was carried out through the following steps:

1) A conductive support layer, was created by slightly modifying the method proposed by Haisong Qi et al. (J. Mater. Chem. A, 2014, 2, 5541): the cellulose core fibre was immersed for 5 minutes in a homogenous aqueous suspension of 1% SWCNT (1 mg/mL) and 0.65% of the surfactant Brij76, keeping out the two extremities. The thread was subsequently air dried for 30 minutes. The dipping and dehydration process was repeated several times, until a normalized resistivity, not exceeding 5 kW cm-1 (which corresponds to about 250 S cm−1), was obtained along the length of the thread dehydrated under vacuum at 40° C. for 8 hours.

Steps from 2) to 5) were analogous to Example 1.

Example 15

A wire thread formed of fibres with a conductive polyester support core, coated with PEDOT: PSS/SWCNT, an electrochromically active layer of PMMA/PEO/SWCNT/NMP/EV/Fc, and a dielectric polymer blend layer of PMMA/PEO.

The system was created by using as a central core a polyester fibre coated with a conductive and electrochromic blend, formed of the PEDOT: PSS polymer and of the SWCNTs. The creation of the wire was carried out by the following steps:

1) The conductive and supporting core was made as in Step 1) of Example 12. Steps from 2) to 5) were analogous to those of Example 1.

Example 16

A fabric in which the weft and warp are made up of the thread of Example 4.

20 metres of the thread referred to in Example 4 were made. With these 10 spools, each with 1 metre of thread were made, and 1 spool with 10 metres of thread. The 10 spools with 1 metre of thread were substituted for the same number of warp threads of a 10 cm high ribbon made with a warp of 80 raffia threads of PP of 4500 dTex and a Monofilament weft of PP of 450 dTex of title, woven on a J.Muller NC 2/130 loom with a Cloth weave.

The new threads in the warp were placed in equally spaced positions. The spool with 10 metres of thread was used to feed the weft, with a density of 8 inserts per centimetre.

The electrical bonding of the extremities of the wires was carried out warp and weft with two copper conductors.

The fabric was powered by a battery capable of supplying a voltage of between 2.4V-3.6V.

The microvoltage regulator, equipped with Bluetooth connectivity, was placed between the battery and the fabric.

The voltage regulator was associated, through Bluetooth technology, to a Smartphone, on which a specific application was running.

Through the graphic interface of this application, it is possible to vary the voltage supplied to the fabric, in order to obtain the desired chromatic variation.

The invention claimed is:

1. An electrochromic yarn formed by two threads electrically isolated by a protective layer of non-electrically conductive polymer, in which each thread is the superposition of three concentric layers:

a first layer being a supporting and conductive core made of a conductive polymer or an organic fiber coated with a combination of PEDOT:PSS/SWCNT or PEDOT: PSS/MWCNT, a second layer being an electrochromic active layer, and a third layer being a polymeric dielectric blend wherein the electrochromic active layer comprises a combination of PVB/SWCNT/NMP/EV/Fc or PVB/MWCNT/NMP/EV/Fc or PMMA/PEO/SWCNT/NMP/EV/Fc or PMMA/PEO/MWCNT/NMP/EV/Fc, wherein the two threads are intertwined and have a break resistance between 35 and 185 Mpa.

2. The electrochromic yarn according to claim 1 wherein the conductive polymer of which the supporting and conductive core is made is a combination of PEDOT/PSS/SWCNT.

3. The electrochromic yarn according to claim 1 wherein the conductive polymer of which the supporting and conductive core is made is a combination of PEDOT:PSS.

4. An electrochromic yarn according to claim 1 wherein the supporting and conductive core is of cellulosic type and is coated with PEDOT:PSS/SWCNT.

5. The electrochromic yarn according to claim 1 wherein the supporting and conductive core is of polyester type and is coated with PEDOT:PSS/SWCNT.

6. Fabrics comprising weft and warp threads, wherein each of the weft and warp threads are formed by the electrochromic thread according to claim 3.

7. Fabrics according to claim 6 further comprising: a variable voltage supply battery in the range 2.4-3.6 V, with a microprocessor voltage regulator, equipped with Bluetooth connectivity for Smartphone connection.

8. Fabrics according to claim 7 wherein a corresponding smartphone application is configured with a graphic interface, the application adapted to be run on a smartphone connected to microprocessor voltage regulator and configured for tuning a chromatic variation of the weft and warp threads.

* * * * *